United States Patent [19]
Kim

[11] Patent Number: 5,926,525
[45] Date of Patent: Jul. 20, 1999

[54] INFORMATION SERVICE METHOD THROUGH AUTOMATIC ANSWERING FUNCTION IN FACSIMILE SYSTEM

[75] Inventor: Sung-Hyun Kim, Gumi, Rep. of Korea

[73] Assignee: Samsung Electronics Co., Ltd., Suwon, Rep. of Korea

[21] Appl. No.: 08/739,325

[22] Filed: Oct. 29, 1996

[30] Foreign Application Priority Data

Oct. 30, 1995 [KR] Rep. of Korea ...................... 95-38185

[51] Int. Cl.⁶ .................................................. H04M 1/64
[52] U.S. Cl. ................ 379/88.23; 379/67.1; 379/100.16
[58] Field of Search .................................. 379/67, 88, 89, 379/100.01–100.16

[56] References Cited

U.S. PATENT DOCUMENTS

| | | |
|---|---|---|
| 5,062,133 | 10/1991 | Melrose .............................. 379/100.16 |
| 5,072,309 | 12/1991 | Brown . |
| 5,090,049 | 2/1992 | Chen . |
| 5,196,943 | 3/1993 | Hersee et al. . |
| 5,287,201 | 2/1994 | Soumiya et al. . |
| 5,357,562 | 10/1994 | Metser et al. ...................... 379/100.14 |
| 5,444,771 | 8/1995 | Ohnishi . |
| 5,483,580 | 1/1996 | Brandman et al. . |
| 5,488,651 | 1/1996 | Giler et al. . |
| 5,517,557 | 5/1996 | Tanaka . |
| 5,532,838 | 7/1996 | Barbari . |

*Primary Examiner*—Fan S. Tsang
*Attorney, Agent, or Firm*—Robert E. Bushnell, Esq.

[57] ABSTRACT

A process of servicing information in a facsimile system having an automatic answering function includes: forming a speech path upon detection of an incoming call from a caller via a telephone line; automatically sending an answering message to the caller to inform the caller available options including to record a voice message in the facsimile system, to transmit a facsimile message to the facsimile system and to receive a variety items of service information stored in the facsimile system in accordance with an information select code; and automatically sending a selected service information to the caller via a remote communication system, when the caller inputs a password after the information select code corresponding to the selected service information is input via the remote communication system.

27 Claims, 5 Drawing Sheets

INFORMATION SERVICE METHOD THROUGH AUTOMATIC ANSWERING FUNCTION IN FACSIMILE SYSTEM

CROSS REFERENCE TO RELATED APPLICATION

This application makes reference to, incorporates the same herein, and claims all benefits accruing under 35 U.S.C. §119 from an application for INFORMATION SERVICE METHOD THROUGH AUTOMATIC ANSWERING FUNCTION IN FACSIMILE SYSTEM earlier filed in the Korean Industrial Property Office on Oct. 30, 1995 and there duly assigned Ser. No. 38185/1995.

BACKGROUND OF THE INVENTION

1. Technical Field

The present invention relates to a facsimile system having an automatic answering function incorporated therein, and more particularly, to an information service through an automatic answering function in a host facsimile system in which a voice guide message is transmitted to a caller to inform the caller to enter a select code for desired information to be transmitted to the caller's remote facsimile system.

2. Background Art

Generally, a facsimile system having an automatic answering function as disclosed, for example, in U.S. Pat. No. 5,287,201 for Calling Receiving Method And Apparatus issued to Soumiya et al., U.S. Pat. No. 5,444,771 for Facsimile Machine Having Answering Function issued to Ohnishi, and U.S. Pat. No. 5,517,557 for Facsimile Apparatus With Automatic Telephone Answering Function issued to Tanaka, includes a facsimile module for facsimile communication, an attached telephone for telephone communication and a recording device for recording a voice message from a caller. Typically, the facsimile system is connected directly via a telephone line for access to the public switched telephone network. When a remote caller wants to call or send a facsimile to a host facsimile system, the caller accesses to the host facsimile system by dialing its telephone number via a remote telephone or a remote facsimile system. If a caller sends a signal via a telephone when the facsimile system answers in a telephone/facsimile mode, telephone conversation is permitted. If the caller sends a signal via a remote facsimile system when the facsimile system answers in the same telephone/facsimile mode, facsimile communication is permitted. On the other hand, if the caller sends a signal via a telephone when the facsimile system answers in an answering/facsimile mode, an answering message is transmitted to the caller upon signal reception and a voice message from the caller is recorded. If the caller sends a signal via a remote facsimile system when the facsimile system answers in the answering/facsimile mode, facsimile communication is permitted.

Facsimile message recorded in a host facsimile system can also be forwarded to an intended recipient who does not have physically access to his or her host facsimile system but can call his or her host facsimile system from a remote location and then direct the facsimile message recorded in the host facsimile system be transmitted for printout to a fully accessed remote facsimile system. Such facsimile system works like a "mail box" such as disclosed in U.S. Pat. No. 5,090,049 for Fax Message Recorder And Relay System And Method issued to Chen, U.S. Pat. No. 5,257,112 for Facsimile Mail System With Mail Center Equipment issued to Okada, and U.S. Pat. No. 5,483,580 for Methods And Apparatus For Non-Simultaneous Transmittal And Storage Of Voice Message And Digital Text Or Image issued to Brandman et al. In Chen '049, for example, a separate fax message recorder and relay system operates in conjunction with a host facsimile system to allow an authorized caller to remotely control the location to which a facsimile message is to be forwarded. Generally, a conventional "fax mail" system is used to store an incoming facsimile message in an electronic format for later recall by a system subscriber. In this manner, the intended recipient may, for example, call into the office from a remote location, determine that a facsimile transmittal is available for him or her, and then direct that the text or image stored in the system be transmitted for printout to a remote facsimile machine.

In recent years however, as facsimile equipment is becoming increasingly common both in the workplace as well as in the home office, facsimile technology becomes more desirable as a means to efficiently market products and to effectively educate consumers about the products in a less costly manner. Traditional use of a computer database on a host computer to deliver information to a remote user via a facsimile system such as disclosed in U.S. Pat. No. 5,068,888 for Interactive Facsimile Information Retrieval System And Method issued to Scherk et al., U.S. Pat. No. 5,072,309 for Information Retrieval Arrangement Including Facsimile Apparatus issued to Brown, U.S. Pat. No. 5,136,634 for Voice Operated Facsimile Machine Network issued to Rae et al., U.S. Pat. No. 5,196,943 for Facsimile Information Distribution Apparatus issued to Hersee et al., and U.S. Pat. No. 5,532,838 for Method And Apparatus For Dynamically Creating And Transmitting Documents Via Facsimile Equipment issued to Barbari, is cost prohibitive particularly when the business is small or medium size and capital expenditure is limited. While local facsimile system can be configured to retain information of a line of products or a product catalogue so that customers can access such facsimile system directly for service information, existing local facsimile system requires that the customers to first request for such service information via a telephone and then wait for reception of such service information concerning a product via a remote facsimile system. This requirement, however, is not efficient because much time and efforts are wasted.

SUMMARY OF THE INVENTION

Accordingly, it is an object of the present invention to provide a new and improved facsimile system and process.

It is another object to provide an improved facsimile system capable of providing service information to a caller's remote facsimile system rapidly and at low cost.

These and other objects of the present invention can be achieved by a facsimile system including a first memory for storing therein an answering message representing a voice message to respond to an incoming telephone call from a caller via a telephone line, and a second memory for storing therein a variety items of service information representing facsimile messages to be serviced to the caller. A controller is operatively connected to the first and second memory for controlling operation of the first and the second memory, and for controlling the servicing of information items representing facsimile messages to the caller by first forming a speech path upon detection of an incoming call from the caller; automatically sending the answering message stored in the first memory to the caller to inform the caller whether to record a voice message in the first memory, to record a facsimile message in said first memory, or to receive one of the variety items of service information stored in the second memory in accordance with an information select code; and then automatically sending a selected service information stored in the second memory to the caller via a remote communication system, when the caller inputs the information select code corresponding to the selected service information via the remote communication system.

A process of servicing information in a facsimile system provides an automatic answering function as contemplated by the present invention by forming a speech path upon detection of an incoming call from a caller via a telephone line; automatically sending an answering message to the caller to inform the caller available options including to record a voice message in the facsimile system, to transmit a facsimile message to the facsimile system and to receive a variety items of service information stored in the facsimile system in accordance with an information select code; and automatically sending a selected service information to the caller via a remote communication system, when the caller inputs the information select code corresponding to the selected service information via the remote communication system.

The present invention is more specifically described in the following paragraphs by reference to the drawings attached only by way of example.

BRIEF DESCRIPTION OF THE DRAWINGS

A more complete appreciation of this invention, and many of the attendant advantages thereof, will be readily apparent as the same becomes better understood by reference to the following detail description when considered in conjunction with the accompanying drawings, in which like reference symbols indicate the same or similar elements components, wherein.

DETAILED DESCRIPTION OF THE PREFERRED EMBODIMENT

Figure 1:
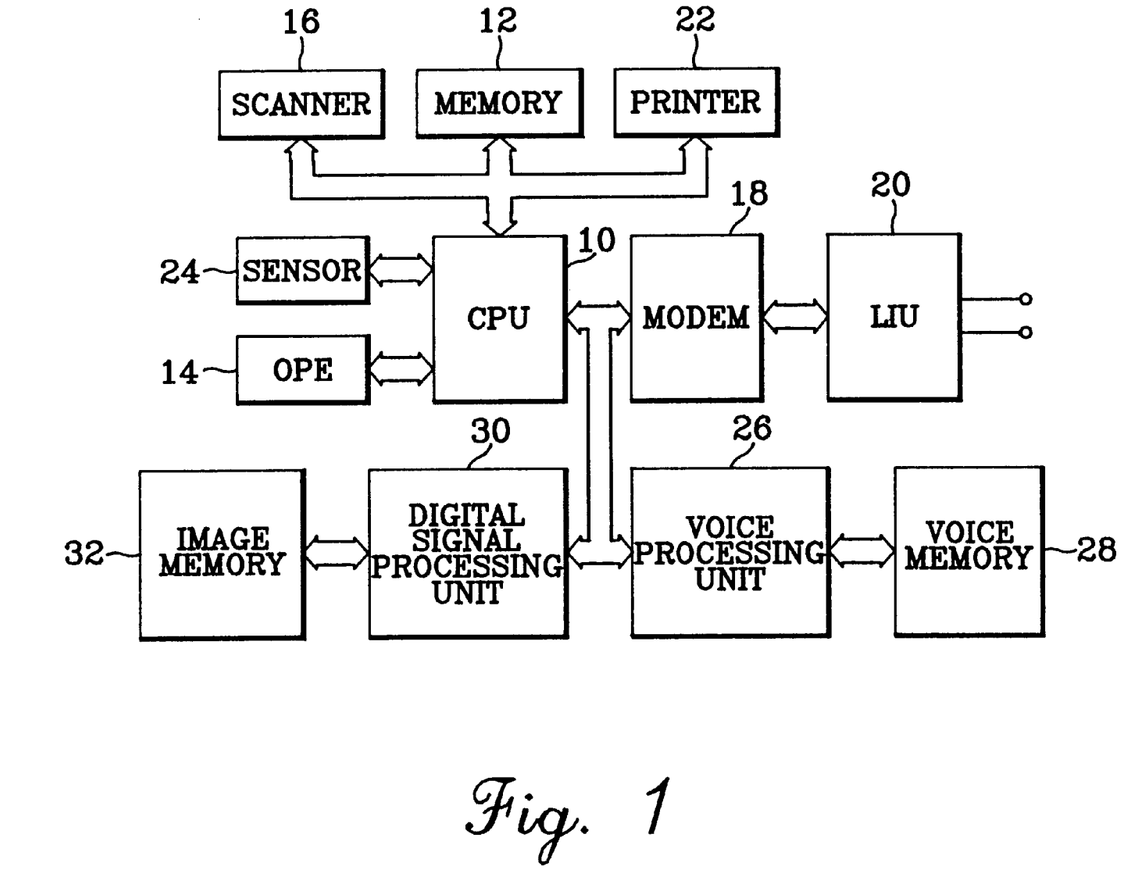
FIG. 1 illustrates a facsimile system having an automatic answering function constructed according to the principles of the present invention.

Referring now to the drawings and particularly to FIG. 1, which illustrates an improved facsimile system having an automatic answering function constructed according to the principles of the present invention. The facsimile system includes a central processing unit (CPU) 10 for controlling operations of the facsimile system, a memory 12, an operational panel OPE 14 containing a display window (not shown), a scanner 16, a modem 18, a line interface unit LIU 20, a printer 22, a sensor 24, a voice processing unit 26, a voice memory 28, a digital signal processing unit 30, an image memory 32, and a telephone (not shown).

The memory 12 includes a program memory such as a ROM (not shown) which stores programs for the CPU 10 to control the general operation of the facsimile system for transmission or reception of image data from another communication system such as a telephone or a remote facsimile system, and a data memory such as a RAM (not shown) which temporarily stores a variety of items of information. The data memory also includes a voice program for allowing recording and transmission of a voice message to a remote caller upon reception of a calling tone. The operational panel (OPE) 14 includes a key input unit comprising alpha-numeric keys for generating key data to the CPU 10 to dial a telephone number of a counterpart communication system, and a window display for providing a visual display of data indicating various modes of operations of the facsimile system. The sensor 24 senses whether a document is input into the facsimile system, or whether copy paper is stored and available for use, and generates an indicative signal to the CPU 10. The scanner 16 transports and scans an image of the input document and then generates image data corresponding to the scanned image. The image data output from the scanner 16 is then processed for either transmission via a telephone line or copy during the copy mode under control of the CPU 10. The printer 22 prints the processed image data received from the CPU 10 on a printable medium such as individual cut sheets of papers during the reception mode and the copy mode under the control of the CPU 10. The modem 18 modulates the processed image data output from the CPU 10 into a modulated image signal for transmission, and duplicates the image signal input to the CPU 10 during the reception mode under the control of the CPU 10. The LIU 20 is connected with a tip and ring terminals of a telephone line to form transmission and reception paths for the modem 18 under the control of the CPU 10.

Voice memory 28 is used to store a voice guide message and business message in a form of digital data recorded by the owner. The voice processing unit 26 synthesizes the voice guide message stored in the voice memory 28 to a voice signal under the control of the CPU 10 to thereby output the same to the MODEM 18, and converts business message received from the MODEM 18 into digital data to thereby store the same in the voice memory 28. The digital signal processing unit 30 encodes/decodes image data outputted from the scanner 16 or received image data. The image memory 32 is used to store service image information of a particular product or a line of products available for customers or callers to call in from a remote telephone and retrieve the same to a remote facsimile system in accordance with corresponding codes.

Figure 2:
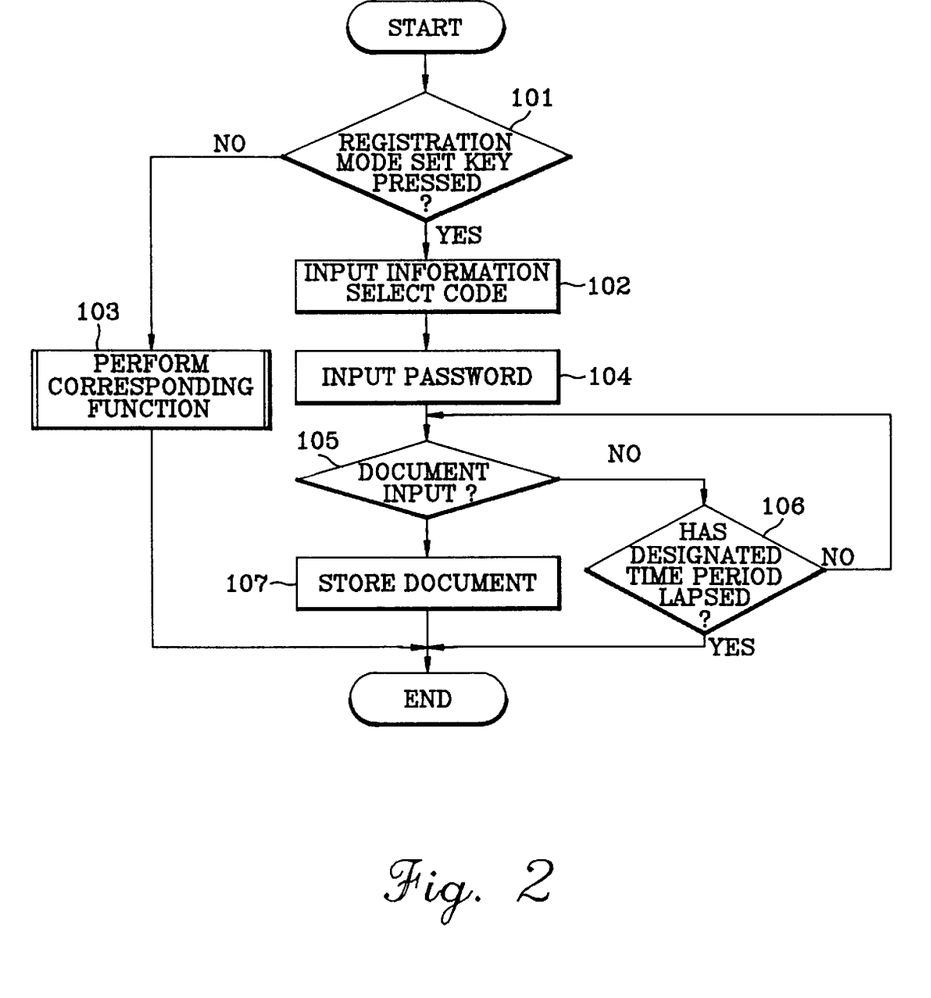
FIG. 2 is a flow chart illustrating a process of registering service information for available products in the facsimile system constructed according to the principles of the present invention.

Turning now to FIG. 2 which illustrates a process of registering service information in a facsimile system constructed according to the principles of the present invention as shown in FIG. 1. Generally, the information registration process requires an operator to input an information select code when a registration mode set key from the OPE 14 is pressed. When the information select code is input, the operator is required to input a password so that image data of an input document corresponding to service information can be registered in the image memory 32 for subsequent retrieval and transmission to a caller's remote facsimile system when the caller calls in and requests for such service information.

Figure 3A:
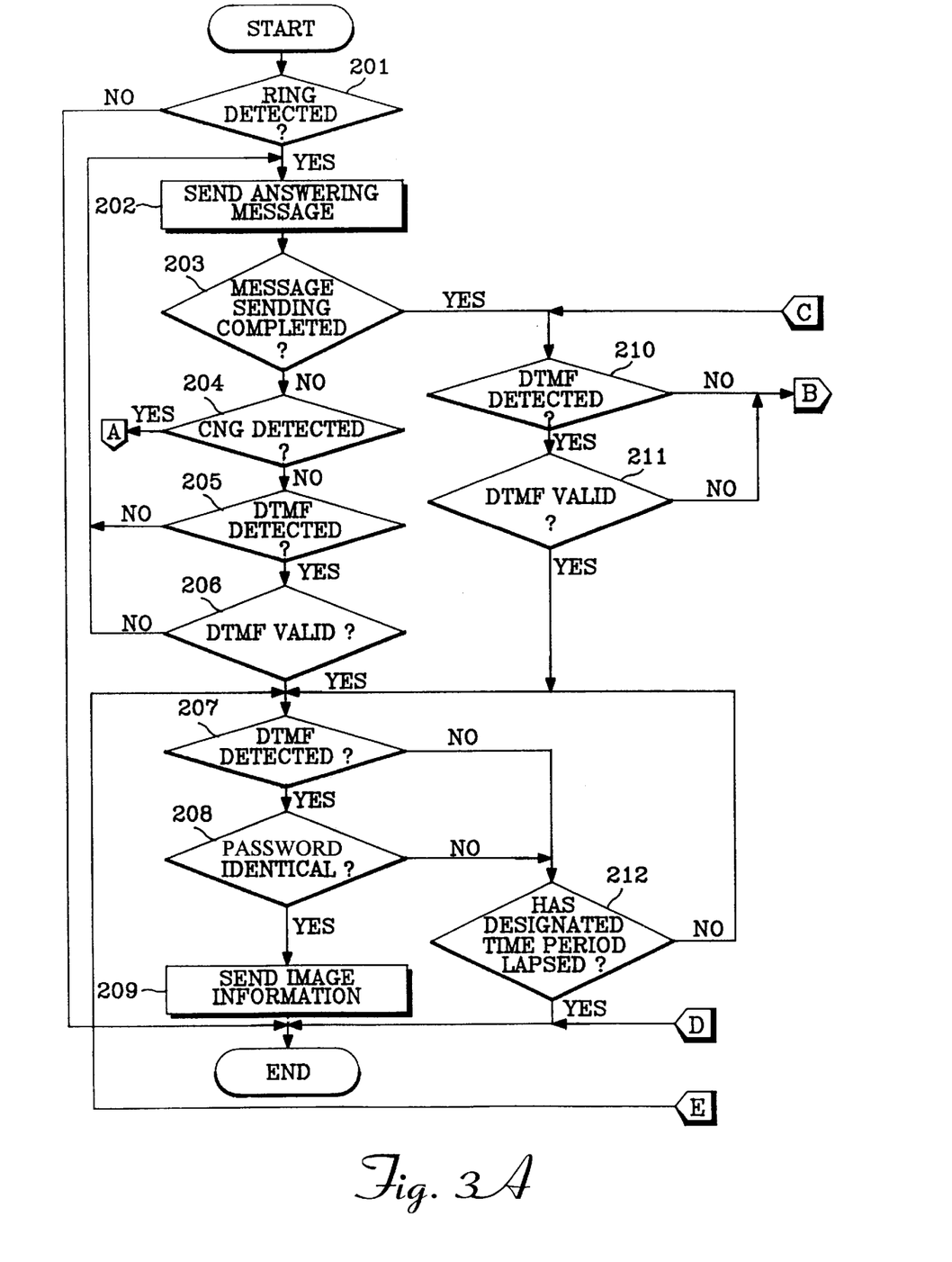
FIGS. 3A to 3C are flow charts illustrating a process of servicing information stored in the facsimile system constructed according to the principles of the present invention.
Figure 3B:
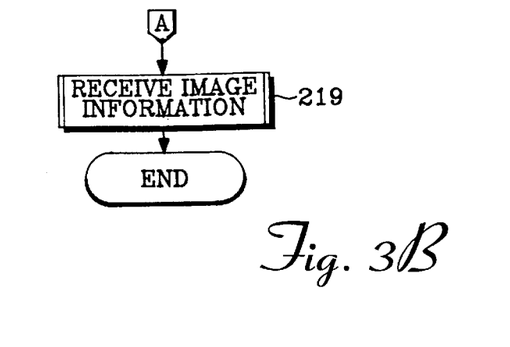
Figure 3C:
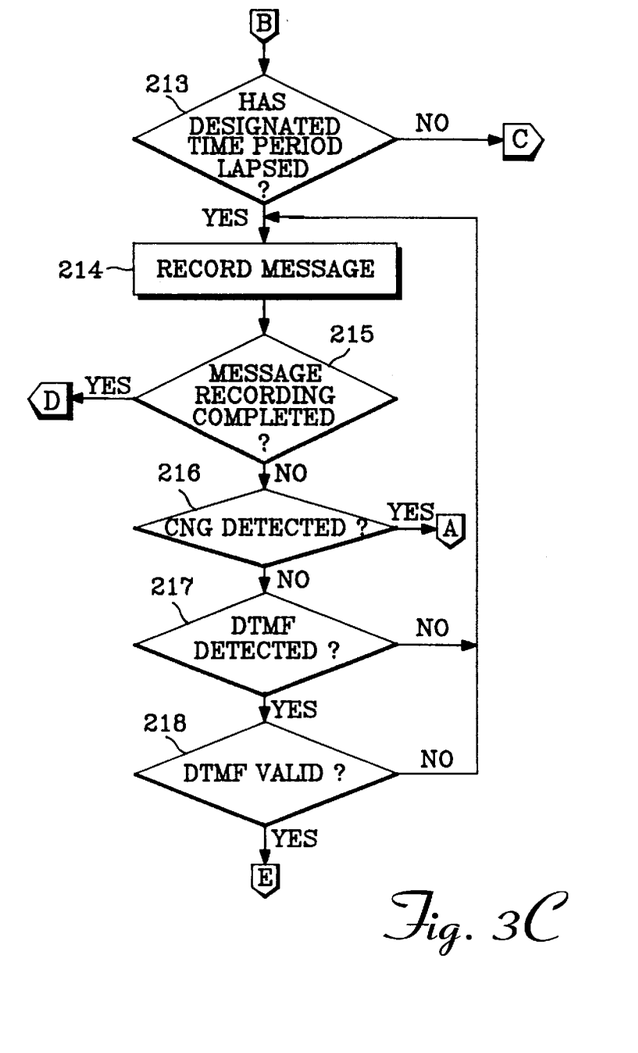

FIGS. 3A to 3C illustrate a process of servicing information stored in the facsimile system constructed according to the principles of the present invention after registration. The information servicing process generally requires connecting a speech path when a designated number of ring signals is detected so as to send an automatic answering message to the caller; detecting whether or not the sending of the automatic answering message is completed; when the sending of the automatic answering message is not completed and a calling tone is detected, receiving a document; when the sending of the automatic answering message is completed and the information service select code is input from the caller, requiring the caller to input a password and if the input password is then correct, transmitting corresponding service information to the caller's remote facsimile system; when the sending of the automatic answering message is completed and a designated time period has lapsed, recording reception messages from the caller; when the calling tone is detected before the recording of the reception message is completed, receiving image data of the document; and when the information service select code is input before the recording of the reception messages is completed, requiring the caller to input the password and if the input password is then correct, transmitting corresponding service information to the caller's remote facsimile system.

Figure 4:
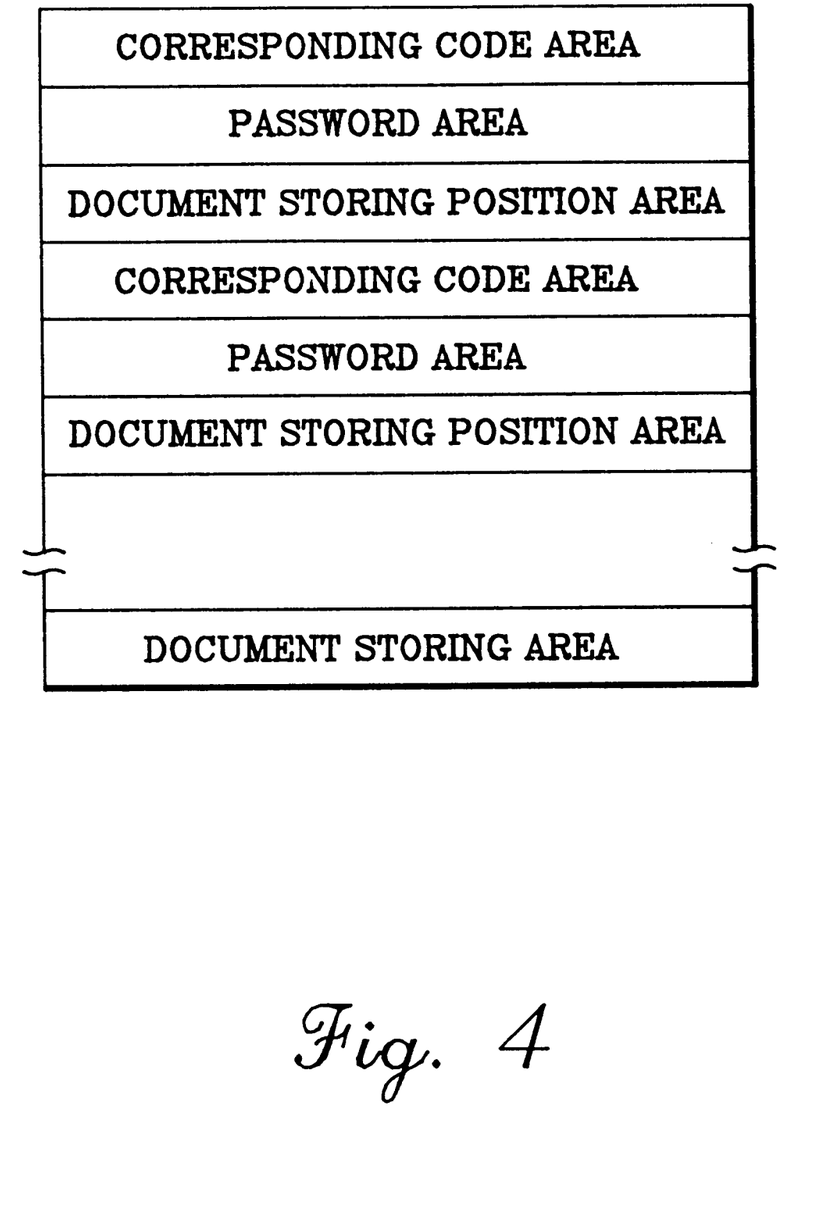
FIG. 4 illustrates a memory map containing registration of service information according to the principles of the present invention.

FIG. 4 illustrates a memory map included in the image memory 32 having a corresponding code area for storing corresponding information select code data, a password area for storing password data and a document storing position area for storing service information of a particular product or a line of products available for customers to call in from a remote telephone and retrieve the same to a remote facsimile system according to the principles of the present invention.

The operation of the facsimile system having an automatic answering function according to the present invention will now be described in detail with reference to FIGS. 1 to 4 as follows.

First, service information or a variety of information items of a particular product or a line of products available for customers need to be registered in the image memory 32. A process of registering service information in a facsimile system as shown in FIG. 2 requires the CPU 10 to determine whether a registration mode set key from the OPE 14 is pressed by an operator at step 101. If no registration mode set key is pressed by the operator, the CPU 10 performs corresponding function at step 103. If the registration mode set key is pressed by the operator, however, the CPU 10 determines whether an information select code is input by the operator from the OPE 14 at step 102. When the information select code is input at step 102, the CPU 10 controls the digital signal processing unit 30 to store the input information select code in the corresponding code area of the image memory 32. After the information select code is input at step 102, the CPU 10 next determines whether a password is input by the operator from the OPE 14 at step 104. When the password is input, the CPU 10 controls the digital signal processing unit 30 to store the input password in the password area of the image memory 32. Thereafter, the CPU 10 determines whether scanned image data of a document for using as service information is input from the scanner 16 at step 105. If there is no input of document bearing such service information, the CPU 10 determines whether a designated time period has lapsed at step 106. If the designated time period has not yet lapsed, the CPU 10 returns to step 105 to wait for document input. If the designated time period has lapsed at step 106, however, the CPU 10 ends the program. When the scanned image data of the document is input, the CPU 10 applies input image data corresponding to the service information to the digital signal processing unit 30 to store the same in a document storing area of the image memory 32 at step 107. As described above, image data of the document for using as various service information is stored in the image memory 32.

Once the service information of a particular product or a lines of products available for customers is stored in the image memory 32, such information as stored in the image memory 32 of the facsimile system is then serviced as shown in FIGS. 3A to 3C. First, the CPU 10 determines whether a designated number of ring signals indicating an incoming call from a caller's remote communication system such as a facsimile system is detected from the telephone line at step 201 as shown in FIG. 3A. When an incoming call is detected from the telephone line, the CPU 10 controls the LIU 20 to establish a speech path. Then, the CPU 10 reads an answering message stored in the voice memory 28 to apply the same to the voice processing unit 26. The voice processing unit 26 synthesizes the answering message to a voice signal to output the same to the MODEM 18. The MODEM 18 then converts the answering message of a digital form into an analog signal to output the same to the LIU 20. Then, the answering message applied to the LIU 20 is sent to the caller through the telephone line. The answering message stored in the voice memory 28 includes a message informing the caller to input an information service select code and a password. For example, the automatic answering message states, for example, "Hello, we are absent. So, if you have any message, please leave your message after hearing a tone, or if you want to use a facsimile machine, please press a start key. Also, if you want to get information through the facsimile machine, please input the password after pressing a numeric key corresponding to information select code, for example, "0" key is for company information service or "1" key is for product information service". The password may be available publicly or privately. For example, if the service information is intended for public use, then either no password is necessary or a generic password is included in the automatic answering message so that the caller can quickly access the host facsimile system from a remote location and request for transmission of such service information to his or her remote facsimile system. However, if the service information is intended for private use, then a secret password must be entered by the caller before any information can be serviced.

When the automatic answering message is sent to the caller's remote telephone, the CPU 10 determines whether the sending of the automatic answering message is completed at step 203. when the sending of the automatic answering message is not completed, the CPU 10 determines whether a CNG tone is detected at step 204. If the CNG tone is detected, the CPU 10 proceeds to step 219 as shown in FIG. 3B to receive image information from the caller's remote facsimile system, and then terminates the program. If, on the other hand, the CNG tone is not detected at step 204, the CPU 10 determines whether a dual-tone multi-frequency DTMF signal is detected at step 205. If the DTMF signal is not detected, the CPU 10 returns to step 202 to continue to send the answering message. However, if the DTMF signal is detected at step 205, the CPU 10 proceeds to step 206 to determine whether the detected DTMF signal is a valid signal, that is, checks whether the DTMF signal represents an information service select code. Then, if the detected DTMF signal is not a valid signal, the CPU 10 proceeds to return to step 202. If the detected DTMF signal is a valid signal, the CPU 10 proceeds to step 207 to determine whether the DTMF signal is detected. In step 207, if the DTMF signal is not detected, the CPU 10 proceeds to step 212 to check whether a designated time period has lapsed. Then, if the designated time period has not yet lapsed, the CPU 10 returns to step 207.

In the meantime, if the DTMF signal is detected at step 207, the CPU 10 proceeds to step 208 to determine whether a password input by the caller corresponds to the password stored in the image memory 32. If the input password from the caller does not correspond to the password stored in the image memory 32, the CPU proceeds to step 212 to determine whether the designated time period has lapsed. But, if the input password from the caller corresponds to the password stored in the image memory 32, the CPU 10 proceeds to step 209 to control the digital signal processing unit 30 to read corresponding service information stored in the image memory 32 and send the service information through MODEM 18 and LIU 20 to the caller's remote facsimile system by way of its DTMF signal via telephone line.

Meanwhile, if the sending of the automatic answering message is completed at step 203, the CPU 10 proceeds to step 210 to determine whether the DTMF signal is detected. If the DTMF signal is not detected at step 210, the CPU proceeds to step 213 to determine whether a designated time period for reception has lapsed. If the DTMF signal is detected, however, the CPU 10 proceeds to step 211 to determine whether the detected DTMF signal is a valid signal, that is, checks whether or not the DTMF signal represents the information service select code. If the DTMF signal is a valid signal, the CPU 10 proceeds to step 207. But, if the DTMF signal is not a valid signal, the CPU 10 returns to step 213 to determine whether a designated time period has lapsed. Then, if the designated time period has not yet lapsed, the CPU 10 continues to stand by until the designated time period has lapsed, and if the designated time period has lapsed, the CPU 10 proceeds to step 214.

In step 214 as shown in FIG. 3C, the CPU 10 controls the voice processing unit 26 to record the reception message (an incoming message: ICM) input through the LIU 20 and MODEM 18 in the voice memory 28, and then proceeds to step 215. In step 215, the CPU 10 determines whether the record of the reception message is completed and if it is completed, terminates the program. However, if the record of the reception message is not completed, the CPU proceeds to step 216 to determines whether a CNG tone is detected. Then, if the CNG tone is detected, the CPU 10 proceeds to step 219 as shown in FIG. 3B to receive image information from the caller's remote facsimile system and terminates the program. If, however, the CNG tone is not detected, the CPU 10 proceeds to step 217 to check whether the DTMF signal is detected. If the DTMF signal is not detected at step 217, the CPU 10 returns to step 214 and controls the voice processing unit 26 to record the reception message (an incoming message: ICM) input through the LIU 20 and MODEM 18 in the voice memory 28. But, if the DTMF signal is detected, the CPU 10 proceeds to step 218 to determine whether the detected DTMF signal is a valid signal, that is, checks whether or not the DTMF signal represents the information service select code. If the DTMF signal is not a valid signal, the CPU 10 returns to step 214. If, on the other hand, the detected DTMF signal is a valid signal, the CPU 10 proceeds to step 207 to determine whether the DTMF signal is detected and if it is not detected, proceeds to step 212. In step 212, the CPU 10 checks whether the designated time period has lapsed and if the designated time period has not yet lapsed, returns to step 207. However, if the DTMF signal is detected in step 207, the CPU 10 proceeds to step 208 to check whether an input password corresponds to the password stored in the image memory 32. If the input password is not identical to the stored password, the CPU 10 proceeds to step 212. If the input password is identical to the password stored in the image memory, however, the CPU 10 proceeds to step 209. In step 209, the CPU 10 controls the digital signal processing unit 30 to read corresponding service information stored in the image memory 32 and sends read information through the MODEM 18 and LIU 20 to the caller's remote facsimile system via the telephone line.

As described, the facsimile system having an automatic answering function constructed according to the principles of the present invention advantageously provides information service regarding, for example, a company or a product available to persons who have quick access to remote facsimile systems. When a caller calls in the host facsimile system retaining the service information by way of his or her remote facsimile system having an attached telephone, an automatic answering message is sent from the host facsimile system to the caller informing the caller that he or she has a number of options including, for example, leaving a recording voice message in the host facsimile system, transmitting a facsimile message to the host facsimile system or allowing the caller to receive a particular service information stored in the host facsimile system in accordance with an input information select code. Upon the reception of the information select code, information retained in the host facsimile system is then serviced to the caller via a facsimile system. As a result, the facsimile system having an automatic answering function of the present invention is able to reduce time and efforts required in providing information to the public.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the appended claims. In the claims, means-plus-function clause are intended to cover the structures described herein as performing the recited function and not only structural equivalents but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A method of servicing information in a facsimile system having an automatic answering function, comprising the steps of:

forming a speech path upon detection of an incoming call of a caller from a telephone line;

automatically sending an answering message to the caller to inform the caller available options including to record a voice message in said facsimile system, to transmit a facsimile message to said facsimile system and to receive a variety items of service information stored in said facsimile system in accordance with an information select code;

receiving the voice message from the caller and recording the voice message in said facsimile system, when a designated time period has lapsed upon completion of said answering message; and automatically sending a selected service information to the caller at a remote communication system via said telephone line, when the caller inputs the information select code corresponding to said selected service information via said remote communication system.

2. The method of claim 1, further comprised of said remote communication system representing a remote facsimile system having an attached telephone.

3. The method of claim 1, further comprised of said variety items of service information including information relating to a company registered in said facsimile system and information relating to a line of products offered by said company and registered in said facsimile system.

4. The method of claim 1, further comprised of receiving said facsimile message from the caller's remote communication system, when a calling tone is detected from the telephone line while said answering message is being sent to the caller via said remote communication system.

5. The method of claim 1, said variety items of service information corresponding to image data registered in said facsimile system.

6. The method of claim 5, further comprising:

determining whether a calling tone is detected from the telephone line while said voice message from the caller is being recorded in said facsimile system; and when the calling tone is detected from the telephone line, receiving said facsimile message from the caller's remote communication system.

7. The method of claim 5, further comprising:

determining whether a dual-tone multi-frequency signal is detected from the telephone line while said voice message from the caller is being recorded in said facsimile system;

when the dual-tone multi-frequency signal is detected from the telephone line, determining whether the dual-tone multi-frequency signal is valid; and when the dual-tone multi-frequency signal is valid, automatically sending the selected service information to the caller via said remote communication system, when the caller inputs the information select code corresponding to said selected service information via said remote communication system.

8. The method of claim 1, further comprising:

determining whether a calling tone is detected from the telephone line while said answering message is being sent to the caller via said remote communication system;

when the calling tone is detected from the telephone line, receiving said facsimile message from the caller's remote communication system;

when the calling tone is not detected from the telephone line, determining whether a dual-tone multi-frequency signal is detected from the telephone line while said answering message is being sent to the caller;

when the dual-tone multi-frequency signal is detected from the telephone line, determining whether the dual-tone multi-frequency signal is valid; and when the dual-tone multi-frequency signal is valid, automatically sending the selected service information to the caller via said remote communication system, when the caller inputs the information select code corresponding to said selected service information via said remote communication system.

9. A method of servicing information in a facsimile system having an automatic answering function, comprising the steps of:

forming a speech path upon detection of an incoming call from a caller via a telephone line;

automatically sending an answering message to the caller to inform the caller available options including to record a voice message in said facsimile system, to transmit a facsimile message to said facsimile system and to receive a variety items of service information stored in said facsimile system in accordance with an information select code included in said answering message;

receiving the voice message from the caller and recording the voice message in said facsimile system, when a designated time period has lapsed upon completion of said answering message; and determining whether a password is input from the caller via a remote communication system to access to the variety items of service information stored in said facsimile system, when the caller inputs the information select code corresponding to said selected service information to be serviced via said remote communication system;

when the password input from the caller corresponds to a password stored in said facsimile system, automatically sending a selected service information to the caller via said remote communication system.

10. The method of claim 9, further comprised of said remote communication system representing a remote facsimile system having an attached telephone.

11. The method of claim 9, further comprised of said variety items of service information include information relating to a company registered in said facsimile system and information relating to a line of products offered by said company and registered in said facsimile system.

12. The method of claim 9, further receiving said facsimile message from the caller's remote communication system, when a calling tone is detected from the telephone line while said answering message is being sent to the caller via said remote communication system.

13. The method of claim 9, further comprising:

determining whether a calling tone is detected from the telephone line while said voice message from the caller is being recorded in said facsimile system; and when the calling tone is detected from the telephone line, receiving said facsimile message from the caller's remote communication system.

14. The method of claim 9, further comprising:

determining whether a dual-tone multi-frequency signal is detected from the telephone line while said voice message from the caller is being recorded in said facsimile system;

when the dual-tone multi-frequency signal is detected from the telephone line, determining whether the dual-tone multi-frequency signal is valid; and when the dual-tone multi-frequency signal is valid, automatically sending the selected service information to the caller via said remote communication system, when the caller inputs the information select code corresponding to said selected service information via said remote communication system.

15. A facsimile system, comprising:

a first memory for storing therein an answering message representing a voice message to respond to an incoming telephone call from a caller via a telephone line;

a second memory for storing therein a variety items of service information representing facsimile messages to be serviced to the caller; and controller means for controlling operation of said first and said second memory, and for controlling the servicing of information items representing facsimile messages to the caller by:

forming a speech path upon detection of an incoming call from the caller;

automatically sending said answering message stored in said first memory to the caller to inform the caller whether to record a voice message in said first memory, to record a facsimile message in said first memory, or to receive one of said variety items of service information stored in said second memory in accordance with an information select code;

determining whether a password signal is input from the caller via a remote communication system to access said variety items of service information stored in said second memory, when the caller inputs the information select code corresponding to a selected service information to be serviced via said remote communication system; and when the password signal input from the caller is valid, automatically sending said selected service information stored in said second memory to the caller via said remote communication system.

16. The facsimile system of claim 15, further comprised of said remote communication system representing a remote facsimile system having an attached telephone.

17. The facsimile system of claim 15, further comprised of said variety items of service information stored in said second memory including information relating to a company registered in said second memory and information relating to a line of products offered by said company and registered in said second memory.

18. The facsimile system of claim 17, further comprised of said controller means receiving said facsimile message from the caller's remote communication system for recording in said first memory, when a calling tone is detected from the telephone line while said answering message is being sent to the caller via said remote communication system.

19. The facsimile system of claim 17, further comprised of said controller means recording the voice message from the caller in said first memory, when the sending of said answering message is completed and a designated time period has lapsed.

20. The facsimile system of claim 17, further comprised of said controller means comprising:

determining whether a calling tone is detected from the telephone line while said voice message from the caller is being recorded in said first memory; and when the calling tone is detected from the telephone line, receiving said facsimile message from the caller's remote communication system for recording in said first memory.

21. The facsimile system of claim 17, said controller means further comprising:

said password signal corresponding to a dual-tone multi-frequency signal, determining whether the dual-tone multi-frequency signal is detected from the telephone line while said voice message from the caller is being recorded in said first memory; and when the dual-tone multi-frequency signal is detected from the telephone line, determining whether the dual-tone multi-frequency signal is valid.

22. The facsimile system of claim 17, said controller means further comprising:

said password signal corresponding to a dual-tone multi-frequency signal, determining whether a calling tone is detected from the telephone line while said answering message is being sent to the caller via said remote communication system;

when the calling tone is detected from the telephone line, receiving said facsimile message from the caller's remote communication system for recording in said first memory;

when the calling tone is not detected from the telephone line, determining whether the dual-tone multi-frequency signal is detected from the telephone line while said answering message is being sent to the caller; and when the dual-tone multi-frequency signal is detected from the telephone line, determining whether the dual-tone multi-frequency signal is valid.

23. A facsimile system for servicing information, comprising:

a line interface unit connected to a telephone network;

a memory unit for storing an answering message representing a recorded voice message, and for storing a variety of service information items representing different facsimile messages to be serviced to a caller; and a controller for controlling the servicing of information items representing different facsimile messages to the caller by:

forming a speech path in response to an incoming call from the caller via said telephone network;

automatically sending said recorded answering message reproduced from said memory unit to the caller to inform the caller available options including an option to record a voice message in said facsimile system, an option to transmit a facsimile message to said facsimile system and an option to receive a variety of service information items stored in said facsimile system in accordance with an information select code included in said recorded answering message;

receiving the voice message from the caller via said telephone network, and recording the voice message in said memory unit of said facsimile system, when a designated time period has lapsed upon completion of said answering message;

determining whether a password is input from the caller via said telephone network to access to the variety of service information items stored in said memory unit, when the caller inputs the information select code corresponding to said selected service information to be serviced to the caller via said telephone network;

when the password input from the caller corresponds to a password stored in said facsimile system, automatically sending a selected service information to the caller via said telephone network.

24. The facsimile system of claim 23, further comprised of said variety of service information items including information relating to a company registered in said facsimile system and information relating to a line of products offered by said company and registered in said facsimile system.

25. The facsimile system of claim 24, further comprised of said controller controlling reception of said facsimile message from the caller, when a calling tone is detected from a telephone line of said telephone network while said answering message is being sent to the caller via said telephone network.

26. The facsimile system of claim 24, further comprised of said controller:

determining whether a calling tone is detected from a telephone line while said voice message from the caller is being recorded in said facsimile system; and when the calling tone is detected from the telephone line, receiving said facsimile message from the caller.

27. The facsimile system of claim 24, further comprised of said controller:

determining whether a dual-tone multi-frequency signal is detected from a telephone line of said telephone network while said voice message from the caller is being recorded in said facsimile system;

when the dual-tone multi-frequency signal is detected from the telephone line, determining whether the dual-tone multi-frequency signal is valid; and when the dual-tone multi-frequency signal is valid, automatically sending the selected service information to the caller via said telephone network, when the caller inputs the information select code corresponding to said selected service information via said telephone network.

* * * * *